No. 892,673. PATENTED JULY 7, 1908.
A. MICHELIN.
WHEEL TIRE.
APPLICATION FILED NOV. 4, 1905.
Fig. 1
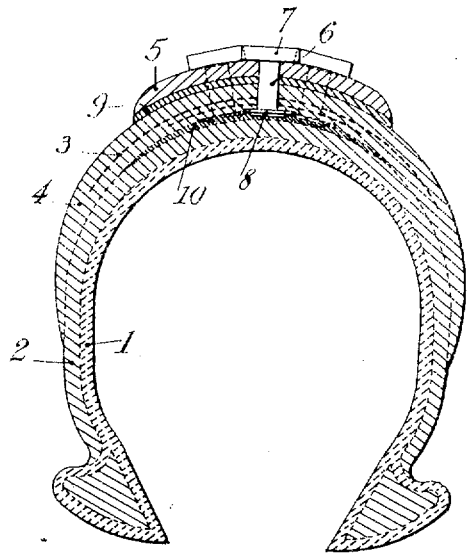
Fig. 2
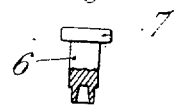
Fig. 3
Fig. 4
Witnesses:
Fred Haynes
F. George Barry
Inventor:
André Michelin
by attorneys
Brown & Seward

UNITED STATES PATENT OFFICE.

ANDRÉ MICHELIN, OF PARIS, FRANCE.

WHEEL-TIRE.

No. 892,673.      Specification of Letters Patent.      Patented July 7, 1908.

Application filed November 4, 1905. Serial No. 285,817.

*To all whom it may concern:*

Be it known that I, ANDRÉ MICHELIN, a citizen of the Republic of France, and resident of Paris, in the Republic of France, have invented a new and useful Improvement in Wheel-Tires, of which the following is a specification.

My invention relates to an improvement in wheel tires and consists in a tire having a tread attached to the body of the tire, a leather band over said tread, rivets passing through said tread and leather band, a layer of rubber uniting said leather band to the tread, and a layer of rubber interposed between the tread and the body, in the middle part of the tire, in which layer the washers of the rivets are embedded.

In the accompanying drawings, Figure 1 represents a cross section of a clencher tire embodying my invention, the inner or pneumatic tube being omitted, Fig. 2 is a detail side view, partially in section, of one of the rivets, Fig. 3 is an edge view of one of the rivet securing washers, and Fig. 4 is a plan view of the same.

The body of the tire is made up of a layer 1 of heavy canvas or other suitable fabric covered by a layer of rubber 2. The tread is made up of cloth 3 and rubber 4 in number and thickness as may be desired and a band 5 of leather with numerous rivets 6 extending through the band of leather and the body of the tread. The heads 7 of the rivets project from the leather band and each rivet is provided with a washer 8 over which the inner end of the rivet is upset. The several cloth and rubber layers of the tread may conveniently be partially vulcanized together before the application of the leather band and the body of the tire composed of the fabric 1 and rubber 2 may or may not be partially or completely vulcanized together before the application of the tread thereto. The band of leather rendered anhydrous by drying the water out of it is applied to the tread with the interposition of a layer of crude rubber or vulcanizing solution 9. The washers 8 are embedded in a layer of crude rubber or vulcanizing solution 10 and the tread receives over its entire interior surface a layer of vulcanizing solution and is then applied to the body. The whole is then submitted to a dry heat sufficient to vulcanize the parts in a manner well known in the art.

The band of leather 5 may be of any desired width or thickness and may be applied in one or several plies and directly to the body of the tire or to the tread as shown and with or without the rivets. The vulcanization of the parts exclusive of the leather, whether partial or complete and before the leather is applied, may be done by either the steam or dry process as may be found most expedient.

What I claim as my invention is:

In combination in a tire, a body, a tread attached thereto, a band of leather over said tread, rivets passing through said tread and band of leather, a layer of rubber uniting said band of leather to said tread, and a layer of rubber between said tread and the body, in the middle part of the tire, in which layer the washers of the rivets are embedded.

In testimony, that I claim the foregoing as my invention, I have signed my name in presence of two witnesses, this 24th day of October, 1905.

ANDRÉ MICHELIN.

Witnesses:
     F. W. CAULDWELL,
     ALCIDE FABE.